United States Patent [19]

Wing

[11] 3,995,793
[45] Dec. 7, 1976

[54] ROTO-WING JET AIRPLANE
[76] Inventor: Russell T. Wing, 20050 Lakeview Ave., Deephaven, Excelsior, Minn. 55331
[22] Filed: Feb. 17, 1976
[21] Appl. No.: 658,488

Related U.S. Application Data
[63] Continuation-in-part of Ser. No. 491,645, July 25, 1974, abandoned.
[52] U.S. Cl. .............................. 244/7 R; 244/7 C; 244/17.23; 416/115; 416/124
[51] Int. Cl.² .................................... B64C 27/22
[58] Field of Search ............... 244/2, 7 R, 7 A, 7 B, 244/7 C, 12 R, 12 C, 17.11–17.27, 23 C, 6; 416/43, 98, 102, 115, 118, 124, 128–130, 171

[56] References Cited
UNITED STATES PATENTS

| | | | |
|---|---|---|---|
| 1,620,787 | 3/1927 | Thomas | 244/7 C |
| 2,008,843 | 7/1935 | Smith | 244/6 |
| 2,162,794 | 6/1939 | VonAsbuth | 416/43 X |
| 2,187,295 | 1/1940 | Alvistur | 244/6 |
| 2,192,300 | 3/1940 | Droitcur | 244/17.23 |
| 2,364,096 | 12/1944 | Platt | 416/43 X |
| 2,414,435 | 1/1947 | Benoix | 244/17.21 X |
| 2,424,769 | 7/1947 | Page | 244/2 X |
| 2,437,700 | 3/1948 | MacFarland | 416/171 X |
| 2,474,362 | 6/1949 | Keranen | 416/115 |
| 2,628,792 | 2/1953 | Griffith | 244/7 R |
| 2,629,567 | 2/1953 | Papadakos | 416/115 X |
| 2,674,421 | 4/1954 | DeCenzo | 244/7 A |
| 2,687,779 | 8/1954 | Peterson | 244/6 X |
| 2,950,074 | 8/1960 | Apostolescu | 244/17.23 |
| 2,959,373 | 11/1960 | Zuck | 244/7 C |
| 3,010,678 | 11/1961 | Gose | 244/17.11 |
| 3,199,809 | 8/1965 | Modesti | 244/23 C X |
| 3,514,051 | 5/1970 | Celayan | 244/6 X |
| 3,558,082 | 1/1971 | Bennie | 244/17.11 X |
| 3,698,666 | 10/1972 | Monti | 244/7 A |
| 3,771,924 | 11/1973 | Buchstaller | 244/7 A X |

FOREIGN PATENTS OR APPLICATIONS

| | | | |
|---|---|---|---|
| 507,343 | 5/1954 | Belgium | 244/7 C |
| 1,479,854 | 3/1967 | France | 244/17.27 |

Primary Examiner—Trygve M. Blix
Assistant Examiner—Barry L. Kelmachter
Attorney, Agent, or Firm—Burd, Braddock & Bartz

[57] ABSTRACT

A jet aircraft is equipped with powered helicopter type rotor blades and control mechanisms whereby it can take off and land vertically, yet in horizontal flight can operate at speeds and altitudes typical of jet aircraft. The rotor blades are foldably retractable to a compact locked, trailing position for horizontal travel and are readily unfoldable by a manually operated control mechanism within the aircraft. While the rotors are rotating, the blade pitch can be selectively controlled and, on power failure, will be automatically controlled to provide for same direction autogyro rotation. In one form, the wings and stabilizers are tiltable between substantially horizontal positions for normal horizontal flight and substantially vertical positions for vertical flight. The craft is ground supported by flexible legs.

19 Claims, 17 Drawing Figures

ROTO-WING JET AIRPLANE

BACKGROUND OF THE INVENTION

The advent of higher speeds and higher load carrying capacities in the jet aircraft of today are creating a demand for longer and longer runways capable of withstanding more impact forces and more dead rolling weight forces than ever before. To find room for such, airports are being constructed increasingly far from the centers of population to provide increasingly inconvenient service at increasingly greater expense.

Furthermore, such larger and faster aircraft cannot be used to provide service near cities not able to provide suitable landing and takeoff facilities.

Flight paths for normal takeoff and landing of today's jet aircraft carry them for long distances in alignment with the runways and, consequently, tend to carry them over large centers of population thus increasing the air pollution and certainly the noise pollution over those centers. Suggested solutions include sharply increasing the angle of takeoff and landing flight paths, thus increasing the chances for accident; restricting takeoff and landing patterns to one or two runways, thus necessarily forcing landings in dangerous cross winds at times; restricting landing and takeoff times to times when the majority of the population is not asleep; and moving the airport sites even farther from the metropolitan centers.

It has been proposed to provide aircraft which can take off vertically and then can be adapted for horizontal flight from place to place, again being capable of vertical landing when the destination has been reached. See, for example, U.S. Pat. No. 2,959,373 to Zuck, granted Nov. 8, 1960; U.S. Pat. No. 1,620,787 to Thomas, granted Mar. 15, 1927; U.S. Pat. No. 2,674,421 to DeCenzo, granted Apr. 6, 1954; U.S. Pat. No. 2,187,295 to Alvistur, granted Jan. 16, 1940; U.S. Pat. No. 2,628,792 to Griffith, granted Feb. 17, 1953; U.S. Pat. No. 3,514,051 to Celayan, granted May 26, 1970; and U.S. Pat. No. 2,008,843, to Smith, granted July 23, 1935. See also Belgium Pat. No. 507,343 to Mignot, granted in May of 1954.

These patents represent everything from very carefully thought theoretical applications to outright wild schemes; and none have found practical or commercial acceptance.

Other suggestions for obtaining vertical landings and takeoffs include circular, whirling wing flying craft such as shown in U.S. Pat. No. 3,199,809 to Modesti, granted Aug. 10, 1965.

In order to reduce the horizontal drag on vertical landing and takeoff aircraft during horizontal flight, it has been suggested to have the helicopter rotor blades fold back into a trailing position. See U.S. Pat. No. 2,424,769 to Page, granted July 29, 1947; U.S. Pat. No. 3,771,924 to Buchstaller, granted Nov. 13, 1973; and U.S. Pat. No. 2,687,779 to Peterson, granted Aug. 31, 1954.

Most of these patents apparently disclosed schemes which were at least theoretically workable, but none have met with commercial acceptance.

It has been suggested to power the rotor blades of a helicopter using the jet or rocket reaction principle. See U.S. Pat. No. 3,010,678 to Gose, granted Nov. 28, 1961; U.S. Pat. No. 2,437,700 to MacFarland, Jr., granted Mar. 16, 1948; and the above mentioned patents to DeCenzo; Celayan; Mignot; and Peterson. See also U.S. Pat. No. 3,558,082 to Bennie, granted Jan. 26, 1971.

It is common to provide some kind of a swash plate arrangement around the outside of a central rotor drive shaft to cause a cyclic motion of the rotor blades along this longitudinal axis to effect the desired direction of a horizontal component of motion through the air; but such systems have lacked an effective, safe and inexpensive means for simultaneously varying the average pitch angle of attack of all of the rotor blades to obtain varying lift speeds or to maintain hovering. See French Pat. No. 1,479,854 to Wagner, dated Mar. 19, 1967; U.S. Pat. No. 2,162,794 to Von Asboth, granted June 20, 1939; U.S. Pat. No. 2,414,435 to Bendix, granted Jan. 21, 1947; U.S. Pat. No. 2,364,096 to Platt, granted Dec. 5, 1944; U.S. Pat. No. 2,629,567 to Papadakos, granted Feb. 24, 1953; U.S. Pat. No. 2,474,362 to Keranen, granted June 28, 1949; and U.S. Pat. No. 2,950,074 to Apostolescue, granted Aug. 23, 1960.

Other patents which appear to present pertinent features of the prior art include U.S. Pat. No. 3,698,666 to Monti, granted Oct. 17, 1972 and U.S. Pat. No. 2,192,300 to Droitcour, granted Mar. 5, 1940.

BRIEF SUMMARY OF THE INVENTION

An aircraft is provided with a power driven vertically upwardly extending drive shaft, supported in a fixedly mounted support column and driven from within the aircraft. The shaft is in driving relationship to a drum-like drive cap at an upper outer end of the shaft. An outer cylindrical portion of that drive cap rotatably supports a radially outwardly extending rotor blade to be rotatable with respect to the cap on the longitudinal axis of the blade.

A first annular rotor blade drive collar is supported on the column and is positioned on an outstanding flange at the bottom of the drive cap. This first drive and collar also supports a rotor blade to be rotatable about a longitudinal rotor blade axis extending perpendicularly out from the drive collar. Means are provided to rotate the drive cap and the first drive collar with respect to each other to position each of the rotor blades in vertical alignment with the other and in trail position with respect to the longitudinal axis of the aircraft on the one hand, and to position the blades so that they are located in diametrically opposite relationship with respect to each other with respect to the drive shaft.

The aforesaid rigid, non-rotatable support column is supported in fixed relationship with respect to the fuselage of the aircraft and extends around the drive shaft in supporting relation thereto. A second annular rotor blade drive collar is rotatably supported with respect to this column; as is a third annular rotor blade drive collar. The third drive collar is also supported on a flange extending outwardly from the second drive collar. The second and third drive collars each support a rotor blade on a rotor blade axis extending radially outwardly from the center of a drive shaft, each blade being mounted for rotation on its longitudinal axis with respect to its drive collar. Means are provided to rotate the second and third drive collars with respect to each other to selectively locate the rotor blades in vertical alignment with each other and in vertical alignment with the rotor blades supported by the drive cap and first drive collar or to locate the rotor blades in diametrically opposed relationship to each other.

Releasable means are provided to lock the drive cap and the three drive collars in position to maintain the rotor blades in vertical alignment with each other when they are in trail relationship with respect to the aircraft during horizontal flight, for example.

Selectively operable locking means is also provided to lock the drive cap with respect to the first drive collar to maintain the rotor blades supported in diametrically opposite relationship to each other, and to lock the second drive collar with respect to the third drive collar to maintain their blades in diametric opposition to each other during vertical flight, for example.

A prime mover is provided to drive the main rotor drive shaft in a first clockwise direction, for example, while driving the third drive collar in an opposite or counterclockwise direction, for example.

Mounted for axial movement with respect to the support column are a pair of lower part-spherical segments. Mounted on each of these part-spherical segments is a slip plate or disc, each situated within one of the second and third annular drive collars and in general alignment with the axis of the rotor blade supported by that collar.

An internally threaded sleeve is threadably mounted on an upper portion of the drive shaft and is rotatably supported in a non-rotating externally threaded sleeve. A pair of integrally connected upper part-spherical segments are threadably mounted on this externally threaded sleeve, and are connected with the lower part-spherical segments in such a manner that any axial movement of the upper segments with respect to the support column will cause a commensurate axial movement of the lower segments.

Separate slip plates or discs are mounted on each of the upper part-spherical segments, the upper plate being within the drive cap and the lower slip plate being encompassed by the first annular drive collar, each being substantially in line with the longitudinal axis of the rotor supported by its cap or first drive collar respectively.

Manual means and also automatic means including means operable on failure of power to the rotors, are provided for rotating the externally threaded sleeve with respect to the drive shaft support column, to simultaneously move all of the part-spherical segments and consequently all of the slip discs or plates up and down with respect to the support column; and means is provided to simultaneously tip all of these slip plates.

Each of the slip plates controls the motion of the outer end of a pitch arm, the inner end of which is fixedly connected to the inner end of one of the rotor blades, thus to control and determine the pitch of the rotor blade as the outer end of the pitch arm spins around with respect to its slip plate.

DESCRIPTION OF PREFERRED EMBODIMENTS

Referring first to FIGS. 1 through 9, a roto-wing jet aircraft 20 illustrating a first embodiment of the invention includes fuselage 20a, a forward rotor supporting hub assembly 21 and a rearward rotor supporting hub assembly 22. As seen in full lines in FIGS. 1 and 2, the rotor blades, designated generally 26, are shown in full lines in trail position behind their respective hub assemblies as when the aircraft is in horizontal flight. Each of these blades, individually designated as 26a–26d inclusive, will be spaced as seen in dotted lines in FIG. 2 when positioned for vertical flight.

Figures 1, 9, 12, 13, 14:
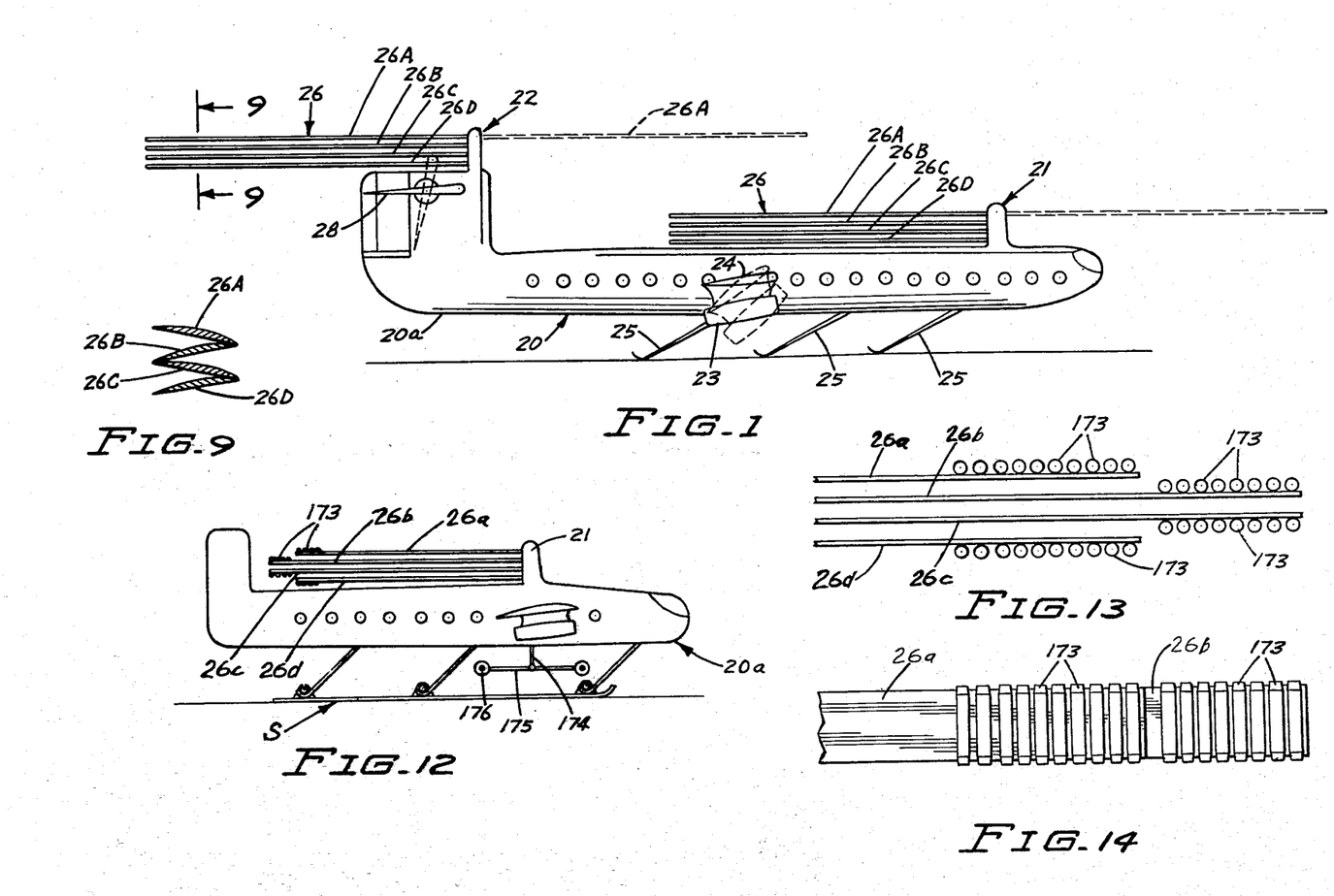
FIG. 1 is a side elevational view of a roto-wing jet aircraft illustrating a first embodiment of the present invention.
FIG. 9 is an enlarged vertical sectional view taken on the line 9—9 in FIG. 1.
FIG. 12 is a side elevational view of a roto-wing jet aircraft illustrating a second embodiment of the invention.
FIG. 13 is an enlarged, fragmentary, side elevational view of the four rotor blades as illustrated in FIG. 12, but as seen from the other side of that figure.
FIG. 14 is a fragmentary top elevational view of the rotor blades of FIG. 13 and showing the positioning of rockets thereon.
Figure 2:
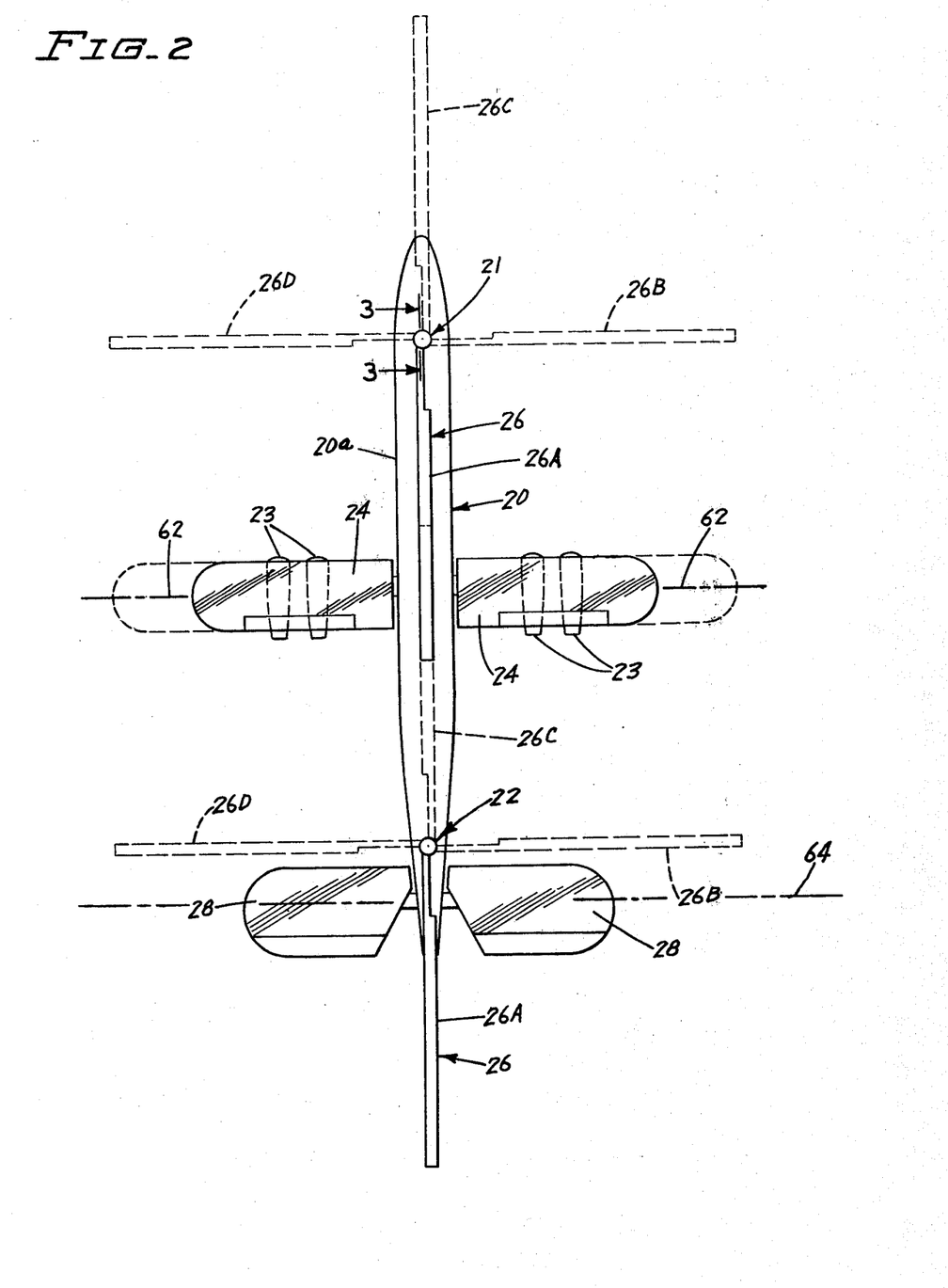
FIG. 2 is a top plan view of the roto-wing jet aircraft of FIG. 1.

The aircraft also includes a pair of wings 24,24, a pair of elevators 28,28, and two pairs of jet engines 23,23, each pair mounted to one of the wings 24.

The aircraft is provided with elongate landing legs 25 which are resilient in character to cushion the shock of landing. These legs are preferably pivotally or foldably or otherwise movably mounted to move from the position shown to a position against or within the fuselage for more efficient operation of the aircraft during horizontal flight. It is to be understood, however, that the aircraft can also be provided with conventional retractable landing wheels so that the aircraft can land on a horizontal glide path in an emergency should the rotors malfunction.

As illustrated in dotted lines in FIG. 1, the wings 24,24 and the elevators 28,28 are rotatably or pivotally mounted about transverse axes 62 and 64, respectively, so that they can be pointed generally upwardly during vertical takeoff and landing, thus to provide a minimum of resistance during the vertical movement of the aircraft. Pivotal movement of the wings, 24,24 and elevators 28,28 can be accomplished by any usual or preferred method, for example, see U.S. Pat. No. 2,959,373 to Zuck, granted Nov. 8, 1960, and U.S. Pat. No. 1,620,787 to Thomas, granted Mar. 15, 1927.

This pivoting of the wings with jet engines 23,23 thereon will likewise allow these engines to be used to provide a vertical component of thrust when landing or taking off.

Since wings 24 are pivotal about axes 62 independently of each other, ailerons will not be needed in some circumstances, although they may be provided as a back up in event of failure of the wing tilting mechanism, or for situations where it is more desirable to tilt a small surface rather than a large one.

It is well known that jet aircraft can operate a high efficiency at high altitudes with less wing area than is needed by these same aircraft to safely land and take off without the vertical assistance afforded by the structure of the invention. This use of a shorter and/or narrower wing, therefore, adds to the efficiency of the aircraft in horizontal flight at altitude. The dotted representation of the wings 24,24 in FIG. 2 is illustrative of the additional wing length which would be required for a conventional jet aircraft to take off and land without the vertical assistance of the rotor assembly of the invention.

To change from horizontal jet flight to vertical helicopter flight, the aircraft assumes a climbing or upwardly inclined attitude approaching stall condition, and its wings 24,24, as the rotor blades 26 continue to rotate to vertical as the aircraft fuselage dips back toward horizontal. The rotor blades associated with the forward hub assembly 21 and the rearward hub assembly 22 unfold and begin powered rotation. The blades preferably rotate in opposite directions, but could rotate in the same direction. In the form of the invention of FIG. 1, the blades of the rearward hub assembly 22 are positioned at a higher elevation than the blades of the forward hub assembly 21 so that although the paths of rotation of the front and rear blades overlap vertically, the difference in elevation enables them to move without interfering with one another.

Rotor blades 26 are powered during takeoff and landing, which power may come from any usual or preferred source, including, by way of example, an engine or prime mover 29, acting through a clutch 31, gear box 32, gear train 36, and a one-way drive or overrunning clutch 25 to a rotor drive shaft 85 driving two rotor blades in a manner to be described. Engine 29 can also furnish power through clutch 31, gear box 32, a gear train 36, and a one way drive or overrunning clutch 38 to a drive gear 40 to furnish power to two additional rotor blades in a manner and for a purpose to be described subsequently.

It is to be understood that the rotor blades can also be driven by one or more of the jet engines 23 through a suitable one-way clutch and transmission mechanism in an appropriate case, not specifically illustrated herein. This is in addition to the use of these same engines to propel the aircraft during horizontal flight.

The forward rotor supporting hub assembly 21 and the rearward hub assembly 22 are substantially identical in their construction and operation, and therefore only hub assembly 21 need be discussed in detail herein.

In addition to positioning the rotors in a trail position behind hub assembly 21, as seen in full lines in FIGS. 1 and 2, structures have been designed such that the rotor blades can be raised and lowered vertically as a unit when in this folded or stacked condition. Thus, the rotor blade units can be designed to be raised high away from the body of the aircraft for use in vertical flight, and can be lowered to the level of the surface of the aircraft or lowered into a well in the fuselage of the aircraft to reduce or even entirely eliminate drag when the aircraft is in horizontal flight. See U.S. Pat. No. 2,628,792 to Griffith, granted Feb. 17, 1953 and U.S. Pat. No. 2,008,843 to Smith, granted July 23, 1935.

Figure 17:
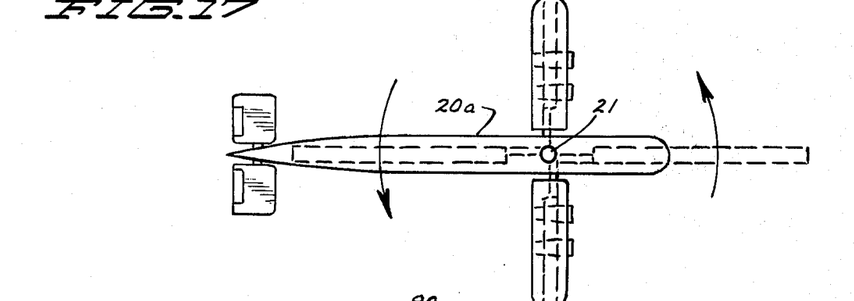
FIG. 17 is a top plan view of a roto-wing jet aircraft illustrating a fifth embodiment of the invention.

The embodiment of the invention illustrated in FIG. 17 includes a one way or bidirectional rotor supporting hub assembly 21 which can be identical with the forward rotor supporting hub assembly 21 of FIGS. 1 and 2. Consequently, description of the detailed construction and operation of hub assembly 21 can refer to the form of the invention as illustrated in FIGS. 1 and 2 and to the form of the invention as illustrated in FIG. 17.

Figures 15, 16:
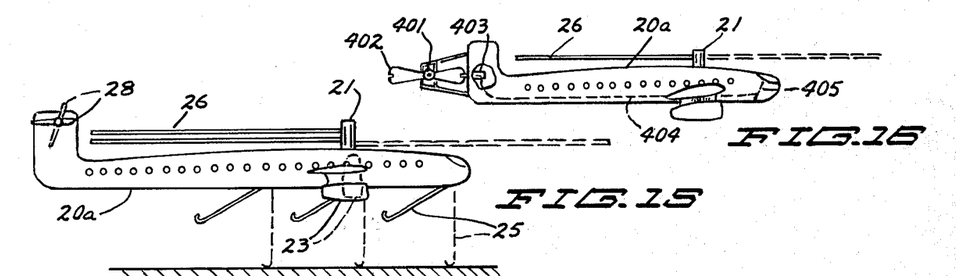
FIG. 15 is a side elevational view of a roto-wing jet aircraft illustrating a third embodiment of the invention.
FIG. 16 is a side elevational view of a roto-wing jet aircraft illustrating a fourth embodiment of the invention.

Generally speaking, the structure within rotor hub assembly 21 and fuselage 20a, now to be specifically described, can be utilized in the invention embodiments of FIGS. 12, 15 and 16 as well.

Figure 7:
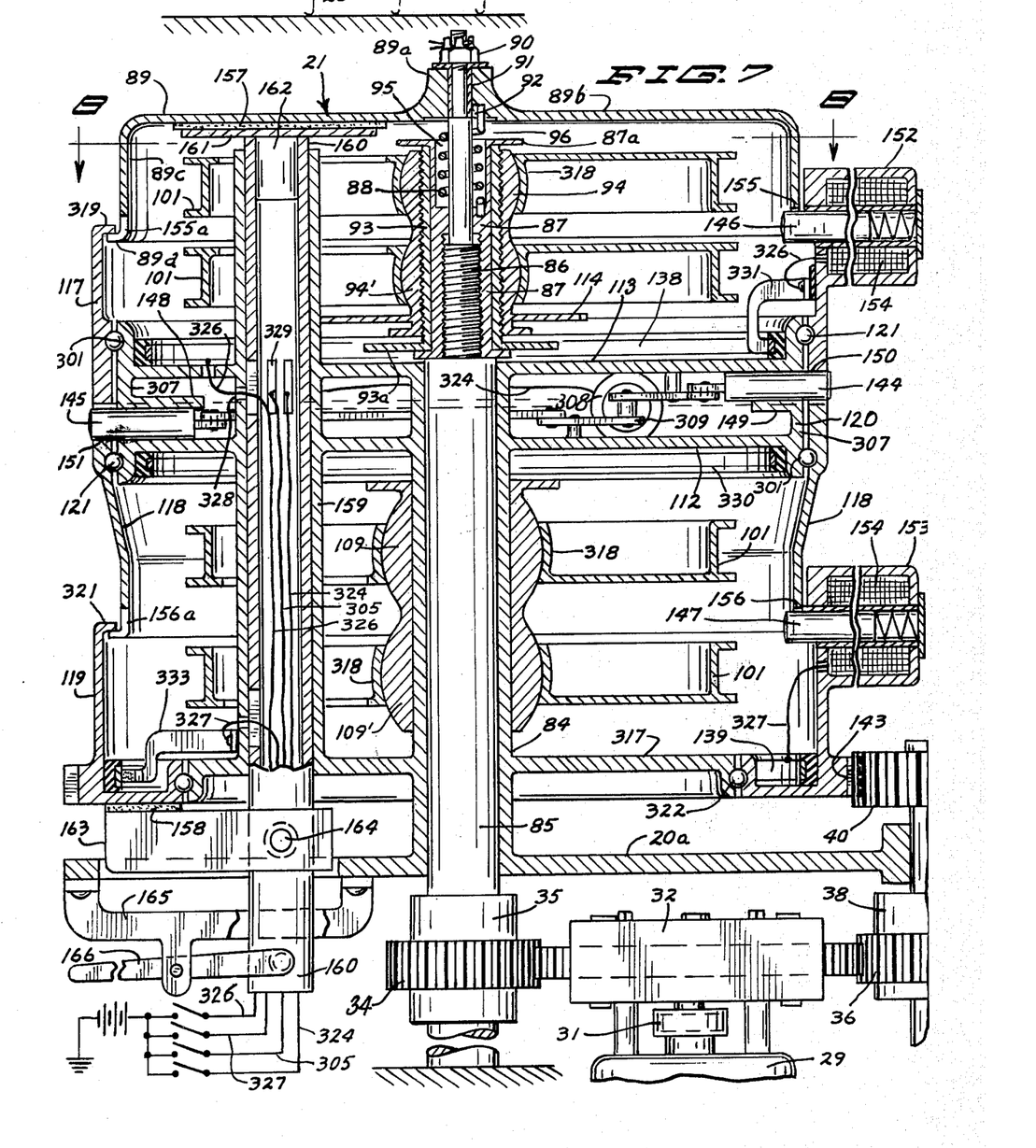
FIG. 7 is a vertical sectional view taken on the line 7—7 in FIG. 6.

In each case, the fuselage 20a supports the rotor supporting hub assembly 21 through the instrumentality of a fixed, nonrotatable support column 84 integral therewith and extending upwardly therefrom. See FIGS. 3 and 7. The column 84 serves in part as a support sleeve within which rotates the rotor drive shaft 85. As seen in FIG. 7, drive shaft 85 receives its power through overrunning clutch 35 so that it will be driven by prime mover 29 in a first direction but will be free to continue movement in that direction whether or not power is being received from the prime mover sufficient to maintain the speed of the drive shaft.

The upper end of shaft 85 is provided with a compound, fast advancing, low pitch, reduced diameter threaded shaft portion 86, which is enclosed by and threadably engages with an internally threaded sleeve 87. A drum-like drive cap 89 is provided with a central hub 89a, a flat disc portion 89b extending out from hub 89a, a cylindrical collar-like portion 89c extending downwardly from the disc portion 89b at the outer periphery thereof, and an outstanding flange 89d extending outwardly from the collar-like portion 89c spaced from the disc portion 89b. The drive cap 89 is mounted to the top of drive shaft 85 for rotation relative thereto, and is connected therewith by means of a castellated nut 90. A suitable bearing 91 is installed between the nut 90 and the drive shaft 85 on the one hand and the hub 89a of the drive cap 89 on the other.

A strong helically coiled spring 88 is situated between the shaft 85 and the sleeve 87 in a cylindrical cavity 95 provided in that sleeve, and a lower end of the spring is drivingly associated with the sleeve 87. The upper end of spring 88 is operably connected to hub 89a by being located in a slot 92 provided in that hub so that partial power is transmitted to the cap 89 resiliently through the medium of spring 88 being driven by sleeve 87, turning with drive shaft 85.

An externally threaded sleeve 93 slidably fits over sleeve 87 so that sleeve 87 is free to rotate within sleeve 93. A pair of integrally connected upper part-spherical segments 94 and 94' are internally threaded and are threadably mounted on the externally threaded sleeve 93.

The upper end of sleeve 87 has an integral annular flanged clutch plate 87a situated in spaced relationship to the flat bottom portion of hub 89a and disc portion 89b of cap 89, the space between the top surface of clutch plate 87a and the bottom portion of hub 89a being designated as the clutch gap or space 96. Thus, when the drive shaft 85 starts to rotate, and as it slips through the bearing 91, its reduced diameter threaded shaft portion 86 works against the sleeve 87 and against spring 88, quickly closing the clutch gap or space 96 and bringing the clutch plate 87a into driving relationship to the underside of the hub 89a, positively forcing the drum 89 to rotate with the rotation of the shaft 85.

Figure 3:
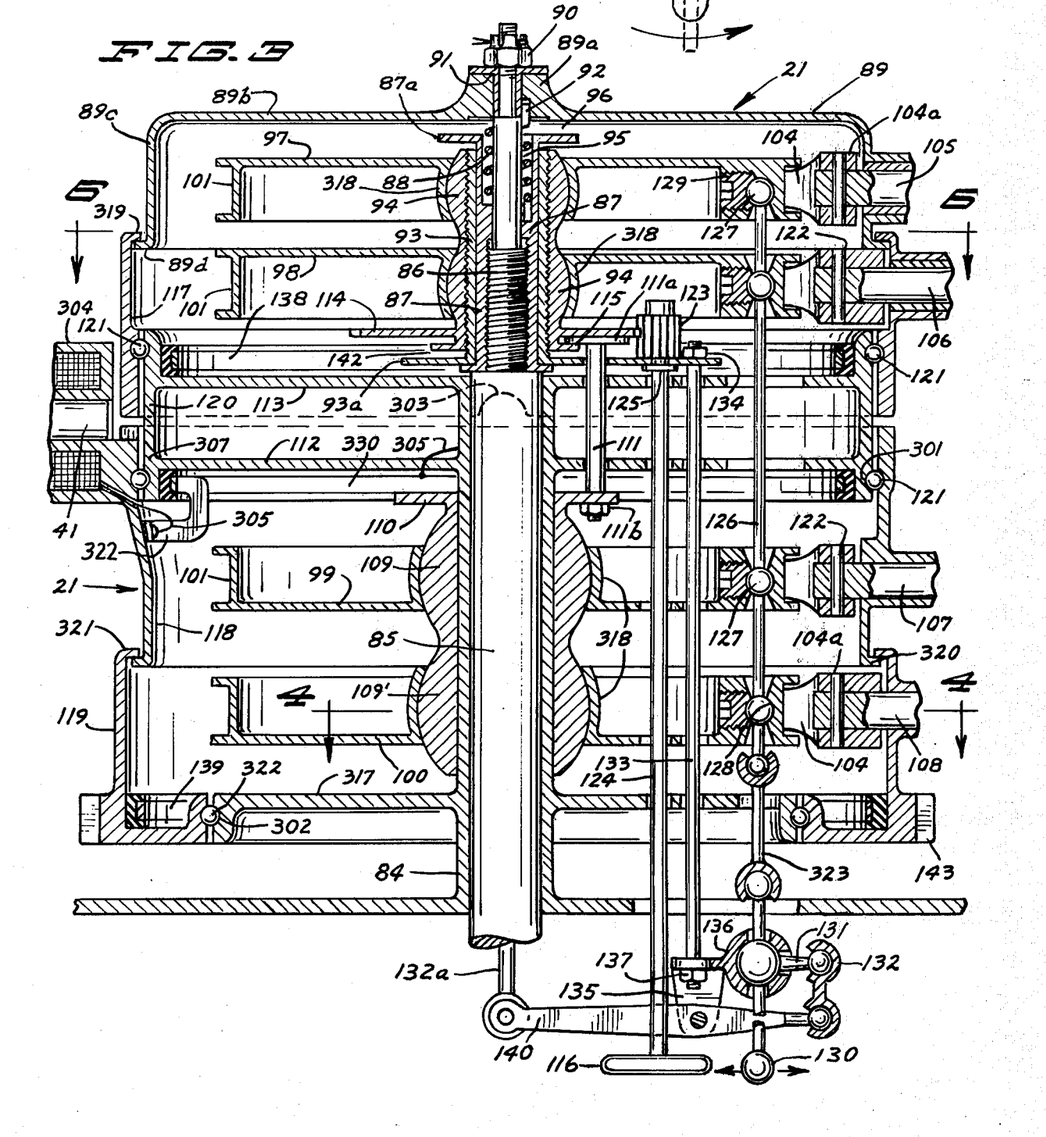
FIG. 3 is an enlarged vertical sectional view taken on the line 3—3 in FIG. 2.
Figure 4:
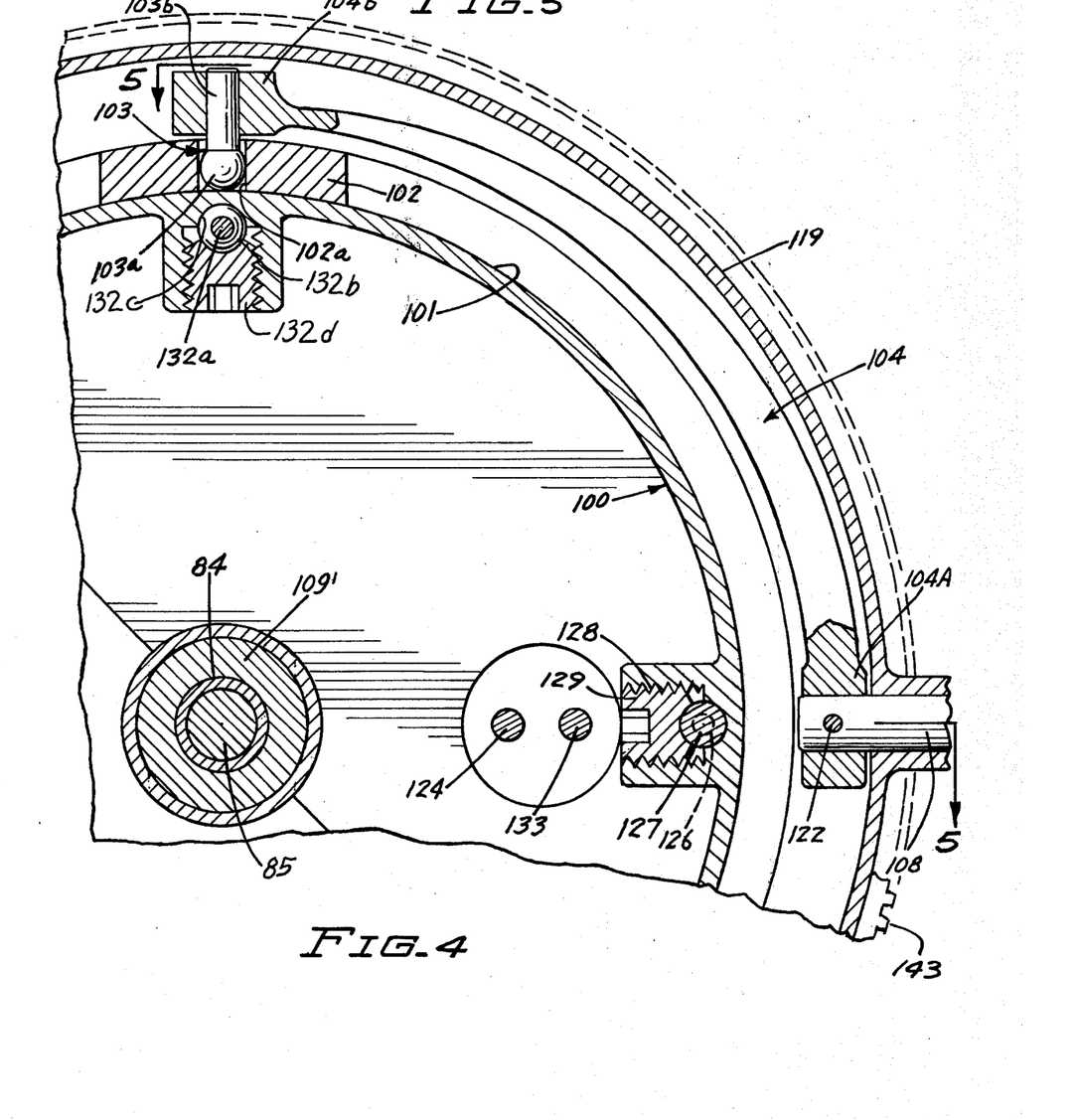
FIG. 4 is an enlarged vertical sectional view taken on the line 4—4 in FIG. 3.
Figure 5:
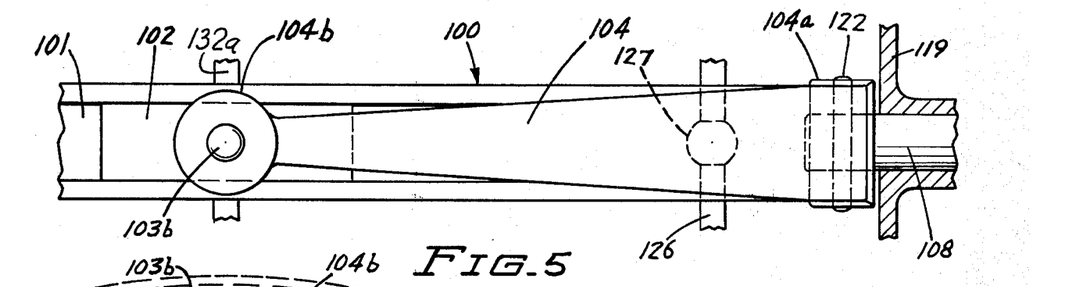
FIG. 5 is a fragmentary sectional view taken on the line 5—5 in FIG. 4.
Figure 6:
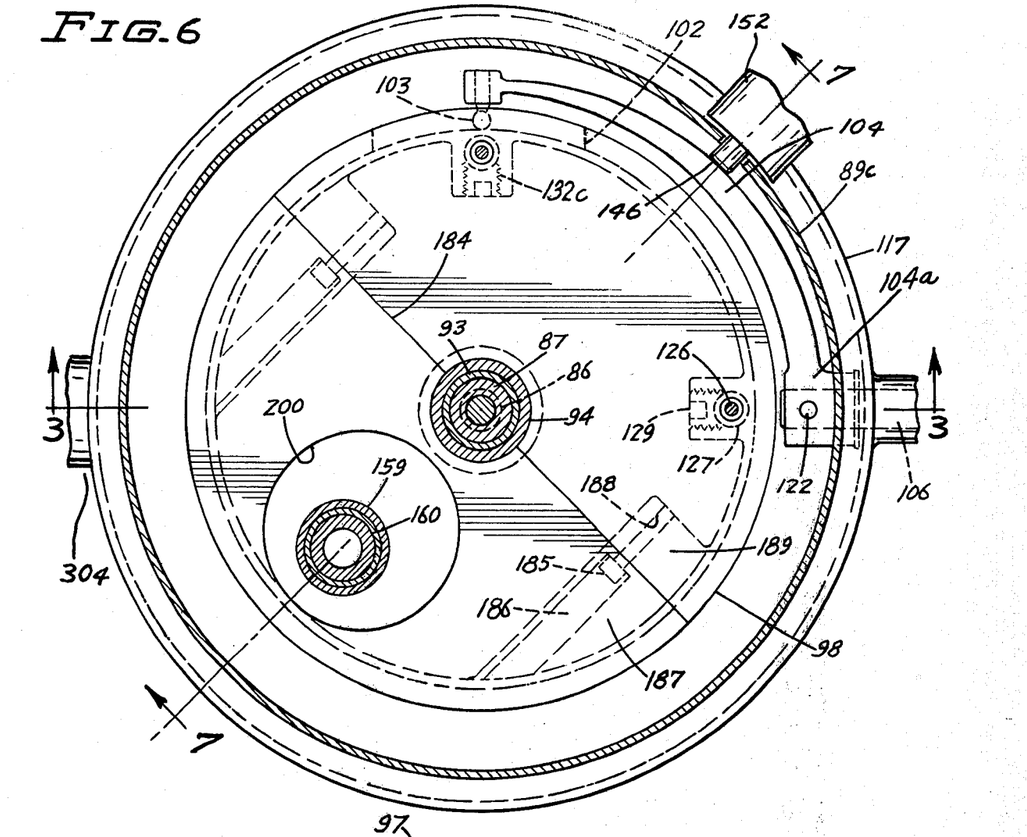
FIG. 6 is a horizontal sectional view taken on the line 6—6 in FIG. 3.

A pair of integrally connected part-spherical lower segments elements 109 and 109' are provided with a cylindrical bore therethrough and are situated in axially slidable relationship to an outside cylindrical portion of the support column 84. The upper element 109 is provided at its upper end with a flat laterally extending horizontal flange 110. As seen in FIG. 3, this flange is connected to at least one vertical rod-like link 111 which extends upwardly to terminate in an enlarged circular cap 111a. A gear 114 is integral with, and extends laterally outwardly from a lower end portion of the bottom part-spherical segment 94', and a lower flange 115 also extends out from an even lower portion of part-spherical segment 94' in spaced relationship to gear 114. The enlarged circular cap 111a of the vertical link 111 is fixedly positioned with respect to the upper part-spherical elements 94, 94' by being affixed between the gear 114 and the flange 115; while the lower end of link 111 is fixed to the part-spherical segment 109 by being bolted by a nut 111b through the laterally extending flange 110 extending outwardly from the top of the part-spherical segment 109.

The fixed support column 84 includes integral parallel spaced apart lower and upper plates 112 and 113, respectively, which extend outwardly to integrally join with an outer cylindrical drum wall 120 which together with the plates 112 and 113 form a cylindrical drum 307 providing appropriate races 301,301 for upper and lower ball bearings 121,121.

Similarly, a bottom plate 317 is integral with and extends outwardly from column 84 and provides a bearing race 302 for ball bearings 322.

Each of the plates 112 and 113 is provided with appropriate openings to allow passage and axial movement of each vertical rod-like link 111.

Slip plates or discs 97, 98, 99 and 100 are arranged concentrically in series in descending order with respect to column 84. The uppermost slip plates 97 and 98 are mounted on part-spherical segments 94 and 94' respectively, while the lower slip plates 99 and 100 are mentioned on the part-spherical segments 109 and 109', respectively.

Each slip plate or disc is provided with an outwardly facing annular channel 101 and with a part-spherical collar 318 located in intimate contacting relationship with its respective part-spherical segments 94,94', 109 or 109'. Each part-spherical collar being free to move on and about said part-spherical segment.

Below the drive cap 89 is a first annular rotor blade drive collar 117 which has an inwardly extending flange 319 positioned on flange 89d of the drive cap 89. First drive collar 117 has an appropriate ball bearing race to run on the upper set of ball bearings 121 of the drum 307.

A second annular rotor blade drive collar 118 is situated just below first drive collar 117, has a race provided so that it can run on fixed central column drum 307 on the lower race of ball bearings 121. A third annular rotor blade drive collar 119 is situated just below second drive collar 118, and is provided with a ball bearing race so that it can run on the ball bearings 322 in the race provided in the bottom plate 317. Second drive collar 118 is provided with a bottom outwardly extending flange 320, while the third annular drive collar 119 is provided with a top inwardly extending flange 321 in overlying contacting relationship with flange 320.

As best seen in FIGS. 3 through 6 and 8, the cylindrical collar-like portion 89c of drive cap 89, the first drive collar 117, second rotor blade drive collar 118, and third annular rotor blade drive collar 119 each support one of the rotor blades 26a through 26d respectively. Rotor blade 26a includes a cylindrical rotor blade shaft 105, supported in drive cap 89; blade 26b has a cylindrical rotor blade shaft 106 supported in first annular drive collar 117; blade 26c has rotor blade shaft 107 supported in second annular drive collar 118; and blade 26d has rotor blade shaft 108 supported in third annular drive collar 119.

In each of the channels 101 of the slip plates or discs 97, 98, 99 and 100 there is slidably mounted a slip segment 102. Each of these segments 102 is provided with a slip segment socket 102a to carry a universal joint 103 comprising a ball pin which includes a ball 103a and a shank 103b integral with the ball. An arcuate pitch arm 104 associated with each of the slip plates and with each of the rotor blade shafts includes a first enlarged end portion 104a pinned to its associated rotor blade shaft by means of an anchoring pin 122. The other end of the pitch arm 104 includes an enlarged circular end portion 104b which is provided with an opening therethrough to receive the shank 103b of the ball pin universal joint 103.

With the drive cap and all three annular drive collars rotating, the rotor blades 26 will be thrown outwardly by centrifugal force and will be held in place in reference to the cap and the collars by the presence of anchoring pin 122 and against the enlarged end portion 104a of the pitch arm 104. The pitch of each rotor blade 26 will be determined by the positioning of its respective pitch arm 104, which in turn, is determined by the positioning of slip segment 102 in annular channel 101 of its associated slip plate 97 through 100. Thus the positioning of each of the slip plates or discs will determine the pitch of its related rotor blade 26.

The previously mentioned gear 114, integral with and extending laterally outwardly from the lower end portion of the part-spherical segment 94' is positioned to be in driving relationship to a pinion 123 which is integral with and on the upper end of a pitch change shaft 124, the lower end of which shaft is integral with a pitch change hand wheel 116.

A support plate 93a extends integrally outwardly at right angles to the longitudinal axis of externally threaded sleeve 93; and is provided with an opening therethrough to receive pitch change shaft 124, thus to serve as a support for the pinion 123. Longitudinal movement of the shaft 124 with respect to the supporting plate 93a is prevented by means of a lock collar 125 in a provided slot in the shaft 124. Support plate 93a is also provided with an opening to permit free passage of each of the vertical rod-like links 111.

To move each of the slip plates or discs, and consequently each of the four outwardly facing annular channels 101 of each slip plate, and consequently to uniformly change the pitch of all four of the rotor blades simultaneously, as when greater or lesser pitch is desired for faster or slower vertical climbing, for example, the pitch change hand wheel 116 will be rotated to rotate pinion 123 and gear 114, thus moving upper part-spherical segments 94 and 94' up or down due to the threaded engagement of the then rotated sleeve 93 inside of them. Because of each link 111, this will simultaneously move lower part-spherical segments 109 and 109', and their associated slip plates up and down.

To provide for a horizontal force component to the vertical lifting of the rotors, a steering mechanism is provided to simultaneously tilt each of the slip plates to develop a cyclic pitch change in the rotor blades 26 in a manner well known in the art. See, for example U.S. Pat. No. 2,629,567 to Papadakos and U.S. Pat. No. 3,771,924 to Buchstaller.

To provide such steering, where all of the rotor blades turn in the same direction, for example, a steering rod 126 is provided with a series of four part-spheres or balls 127 at spaced intervals along the length thereof; each of these part-spheres being operably connected to one of the slip plates to provide a form of universal joint whereby the slip plate to which it is connected can move about its associated part-spherical segment 94,94', 109 or 109' responsive to movement of the rod 126. Steering rod 126 is connected to each of the slip plates by suitable ball sockets 128 provided in each slip plate, 97, 98, 99 and 100; with the part-spheres 127 being held in the sockets by set screws 129.

A second steering rod 132a is provided with a plurality of part-spherical balls 132b, each situated in alignment with one of the slip plates and held in a slip plate socket 132c by a set screw 132d. Thus, the vertical space between each adjacent slip segment 102 will remain fixed, insuring that the pitch angle of each rotor blade will vary uniformly with that of every other rotor blade.

First steering rod 126 is connected at its lower end through a universal link 323 to a control or joy stick 130.

A spacer rod 133 extends through provided openings in lower and upper plates 112 and 113 of drum 307, bottom plate 317, and slip plates 99 and 100 to be fixedly positioned to supporting plate 93a by nut 134 and to be fixedly positioned to a spacer rod bracket 135 to which it is fixedly positioned by the nut 137. Bracket 135 is integral with and extends outwardly from a universal control stick housing 136.

Second steering rod 132a extends downwardly from slip plate 100 to be pivotally connected to a first end of a steering lever arm 140. This lever arm 140 is pivotally mounted to bracket 135, and a second end thereof is connected to a forward arm 131 of the control stick 130 through a universal link 132.

Movement of the control stick 130 to the right or left as seen in FIG. 3 will tend to move steering rods to cause forward and rearward tilt; while movement of the stick in direction at right angles to the plane of FIG. 3 will cause appropriate steering rod movement to induce cyclic rotor blade pitch action to cause aircraft movement to the right or the left.

The upper sphere system including part-spherical segments 94 and 94' and the slip plates 97 and 98 which are mounted thereon have a range of vertical movement represented by the space 142 between plate 93a and collar 115 and the space between the upper end of part-spherical segment 94 and the underside of plate 87a.

In order to deliver one-way power to the third annular rotor blade drive collar 119, the lower end of drive collar 119 is provided with an integral outwardly extending driven gear 143. As seen in FIG. 7, this gear meshes with drive gear 40 to be driven through one-way drive overrunning clutch 38.

Each of the slip plates 97 through 100 inclusive is split diametrically along a line 184 into two equal parts for ease of assembly, the two parts being held together by screw fasteners 185, each of which is installed in an opening 186 in a boss 187 on a first half of each slip plate and threadably engages a threaded opening 188 provided in a boss 189 on the other half of the slip plate.

To lock the drive cap and annular drive collars with respect to each other and with respect to support column 84 either in the inoperative horizontal flight phase, or in the operative vertical movement phase, a plurality of movable locking elements or keys 144 through 147 are provided. Keys 144 and 145 are shown as cylindrical longitudinally movable elements slidably mounted respectively in enlarged key supporting bosses 149 and 148. These bosses form integral parts of the interior of the drum 307 and support the keys to move through openings in the outer cylindrical drum wall 120. Keys 144 and 145 are adapted to be selectively installed in openings 150 and 151 formed in drive collars 117 and 118 respectively, to lock these collars against rotational movement relative to support column 84 and the fuselage 20a of the aircraft. Removal of keys 144 and 145 from their openings 150 and 151 respectively unlocks drive collars 117 and 118 from column 84. Locking and unlocking of keys 144 and 145 is accomplished through the instrumentality of a solenoid 308 and appropriate linkages 309 between solenoid 308 and keys 144 and 145. One terminal of the solenoid is grounded (not shown) and a hot lead wire 324 of the solenoid passes outside of the hub assembly 21 to an appropriate control panel in a manner to be described.

Key 146 forms a part of a solenoid 152 which is mounted on first annular drive collar 117 and serves to lock that drive collar to drive cap 89 by entering a provided opening 155 in that cap. A winding 154 of solenoid 152 is grounded on one end (not shown) and hot lead wire 326 extends from the other end of the winding to the control panel outside of the hub assembly 21 in a manner to be described.

Key 147 forms a part of solenoid 153 which is mounted on third annular control collar 119, and locks that collar to second collar 118 by entering a provided opening 156 in collar 118. Solenoid winding 154 of the solenoid 153 is likewise grounded (not shown) and its hot lead wire 327 also extends to the control panel.

When it is desired to terminate rotor blade operation when the aircraft is in flight and sufficient velocity of horizontal movement has been obtained to support the aircraft, it is helpful to have a braking system to slow down rotation of the drive cap 89 and first annular drive collar 117 and their associated rotor blades 26a and 26b. For this purpose, an upper brake pad 157 is provided. Likewise, to slow down the second and third annular drive collars 118 and 119, respectively, and their associated rotor blades 26c and 26d, a lower brake pad 158 is provided. These brake pads are supported on a hollow brake rod 160 which is slidably supported for vertical movement in a stationary brake rod supporting sleeve 159 which constitutes an integral rigid part of the support column 84. Upper brake pad 157 is attached to an upper brake plate 161 which in turn is supported on a boss 162 situated inside of brake rod 160.

Lower brake pad 158 is supported by a lower brake plate 163 extending integrally and rigidly out from brake rod 160, being fastened thereto by fastener 164. A brake yoke 165 is shown fastened to the interior of the fuselage 20a, and a hand brake lever 166 is pivoted to the yoke 165 and to the hollow brake rod 160 in such a manner that downward pressure on the outer end of the brake lever will force the brake rod 160 in an upward direction causing the brake pads 157 and 158 to slow down all of the drive collars and the drive cap, assuming that cap 89 and first drive collar 117 are keyed to each other and assuming that second drive collar 118 and third drive collar 119 are keyed to each other.

Suitable openings 200 are provided in the slip plates 97 through 100, to receive the stationary brake rod supporting sleeve 159, so these plates are not inhibited in their tilting and/or vertical movements by the presence of this sleeve 159.

When the hub assembly 21 and all four rotor blades 26 are to be used to rotate in a single direction, first drive collar 117 and second drive collar 118 are keyed to each other without being keyed to the support column 84. To do this, a key 41, forming a part of a solenoid 304 mounted on second annular collar 118, is activated to engage a provided opening 303 in drum 117 at 90° from the position shown in FIG. 3, at which time all four rotor blades will be set at 90° apart and in dynamic balance. Solenoid 304 has one terminal grounded (not shown) and is energized through hot lead wire 305 through the hub assembly 21 and into the interior of the fuselage 20a and to an appropriate control panel, all in a manner now to be described.

Solenoid 308, being permanently mounted in unmoving or fixed support column 84, is connected to an appropriate switch on a control panel through one of a set of elongated ports 329 in the hollow brake rod 160, reaching that port through a provided opening (not shown) in the stationary brake rod supporting sleeve 159 and out of the bottom of the hollow brake rod 160.

Hot lead wires 326, 327, and 305 are connected through the hollow brake rod 160 from solenoids 152, 153 and 304, respectively, through a series of brushes and slip rings.

Stationary slip rings 138 and 330 are fixedly mounted with respect to upper drum plate 113 and lower drum plate 112 respectively through suitable insulating blocks to electrically isolate the slip rings from these plates. Hot lead wire 326 extends from solenoid 152 to a brush which is also fixedly mounted on the first annular ring 117 and is, at the same time, in sliding contact with slip ring 138. Thus the brush forms an extension of the hot lead wire 326, and a further extension of that lead is soldered or brazed to the slip ring, extends through a provided opening 328 in stationary supporting sleeve 159, and through one of the elongated ports 329 to the interior of brake rod 160 and beyond.

As best seen in FIG. 3, hot lead wire 305 is fastened to a brush mounted on second annular drive collar 118, and is in sliding electrical contact with the stationary slip ring 330. An extension of hot lead wire 305 is welded or brazed to the slip ring 330, and extends through an opening (not shown) in the stationary supporting sleeve 159, to appear through an elongated slot 329 in the hollow rod 160 and beyond.

A rotatable slip ring 139 is mounted on a suitable insulating block to rotate with a lower portion of the third annular drive collar 119. As best seen in FIG. 7, hot lead wire 327 from solenoid 153 is soldered or brazed onto the slip ring 139, and a brush 333 is fixedly mounted with respect to the support column 84, and specifically, as shown, to the stationary brake rod supporting sleeve 159. Brush 333 is in electrical contact with the slip ring 139, and an extension of hot lead wire 327 extends from the brush, through a provided opening in sleeve 159, an elongated pot in rod 160, and beyond. To energize the appropriate solenoid, an appropriate switch illustrated in FIG. 7 is closed connecting that solenoid through a source of electro-motor force to ground in the manner shown. Should there be difficulty in grounding the rotating parts to insure positive action of the solenoids, additional slip rings and brushes can be provided in a manner well known in the art.

VERTICAL FLIGHT OPERATION

For takeoff, keys 146 and 147 will be in the unlocked position by energizing solenoid windings 154 of solenoids 152 and 153 by closing the appropriate switches to provide the flow of electrical energy to coils 154; and drive shaft 85 and third annular drive collar 119 are set in motion by the prime mover or engine 29. As the shaft 85 starts to rotate and as it slips through bearing 91, the compound, low pitch, reduced diameter threaded shaft portion 86 of the shaft 85 turns in the internally threaded sleeve 87 to force it up against the spring 88 and this action quickly closes the space 96 between the clutch plate 87a and the hub 89a of the drive cap 89. The developed torque of the spring 88 and the clutch plate contact with the cap 89 causes the cap and its rotor blade shaft 105 and rotor blade 26a to rotate with shaft 85.

At the same time, third annular drive collar 119 will be rotating and with it will be rotating rotor blade shaft 108 and rotor blade 26d. When the shafts 105 and 108 have reached one-half turn, keys 144 and 145 will be unlocked by providing energy to solenoid 309 through hot lead wire 324 at the control board. Simultaneously, solenoids 152 and 153 will be deenergized, allowing keys 146 and 147 to engage respectively in an opening or notch 155a provided in drive cap 89 diametrically opposite to opening 155, and in an opening 156a which is provided in second annular drive collar 118 diametrically opposite to the opening 156. At this point, all four blades will be rotating in opposite directions and in dynamic balance, and power may be increased for takeoff.

As the gap or space 96 closes, all four universal slip plates 97, 98, 99 and 100 move to a position which sets each pitch arm 104, and consequently all rotor blades 26, to the correct and desired pitch for takeoff. Pitch adjustment may also be made by turning pitch change hand wheel 116 and by tipping or turning steering wheel 130.

AUTOMATIC AUTOGYRO ACTION

If and when power to the rotor blades is lost or otherwise removed, it is desirable or necessary that the momentum of the rotor blades not be dissipated but that they continue to rotate in the same direction but with a reversed pitch so that the falling action of the aircraft will force the blades to continue movement and the plane will fall or land under the well known autogyro principle.

At the point that power is lost, the overrunning or one-way drive clutches 35 and 38 will come into effect and the inertia of the rotor blades 26 will continue rotation of the rotor drive shaft 85 and of the annular drive collars. Spring 88 will act to cause the clutch plate 87*a* to back off due to the action of the internally threaded sleeve 87 moving down on the threads of reduced diameter portion 86 of drive shaft 85, and this will cause all four of the slip plates 97 through 100 to move down causing a reversal of the propeller pitch on all of the rotor blades 26 and their rotor blade shafts 105 through 108. This will automatically cause autorotation of the rotors due to the windmill effect of the air on the blades, thus resulting in a parachute-like supporting action and a descent at a rate which will allow a safe landing and will also allow for limited steering control to pick a landing spot.

At the point that power is recovered, it will be fed to shaft 85, internally threaded sleeve 87 will be forced upward once again, and this will automatically change the pitch to provide for climbing action.

TRANSITION FROM VERTICAL TO HORIZONTAL FLIGHT

When sufficient vertical height has been obtained, to change over to horizontal flight, the steering wheel 130 is used to obtain a maximum horizontal force component in forward direction. In the case of the embodiments of the invention illustrated in FIGS. 1 and 15, the wings 24 and the elevators 28 will be rotated on axes 62 and 64 respectively and locked into position for horizontal flight. Jet engines 23 will be activated if not already operating to furnish a vertical component during vertical flight. A sufficient power will be developed in the jet engines 23 to move the aircraft horizontally at sufficient speed developing enough wing lift to maintain altitude. Power to rotor drive shaft 85 and to third annular rotor blade drive collar 119 will be removed, as by operating clutch 31 as a disconnect from prime mover 29, for example. Hand brake lever 166 or its mechanical equivalent will be utilized to apply brake plates 161 and 163 to slow the rotation of drive cap 89 and third drive collar 119, respectively.

Figure 8:
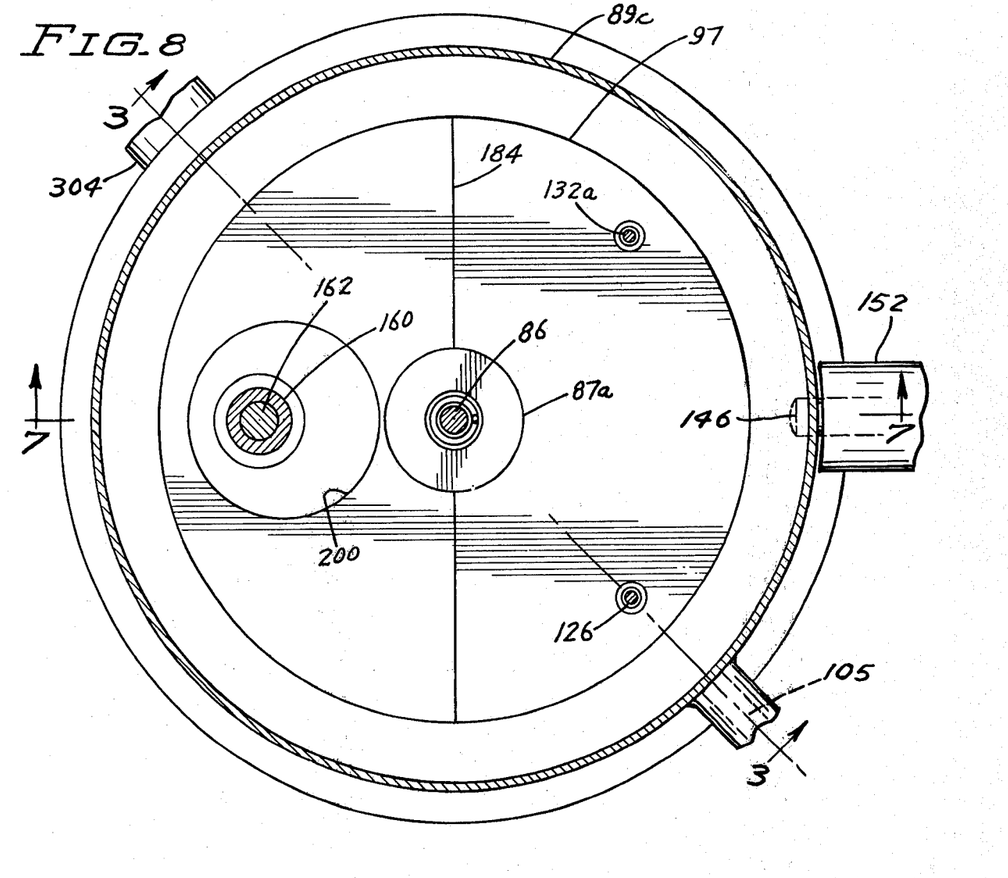
FIG. 8 is a horizontal sectional view taken on the line 8—8 in FIG. 7.
Figure 10:
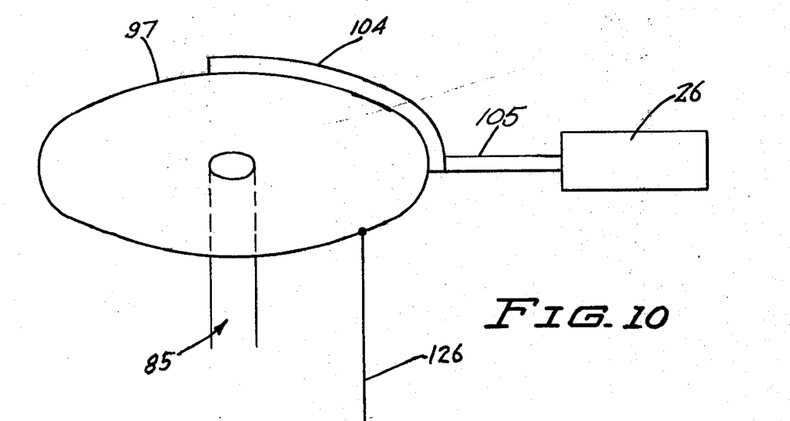
FIG. 10 is a diagrammatic view schematically illustrating a manner of controlling the pitch of one of the rotor blades.
Figure 11:
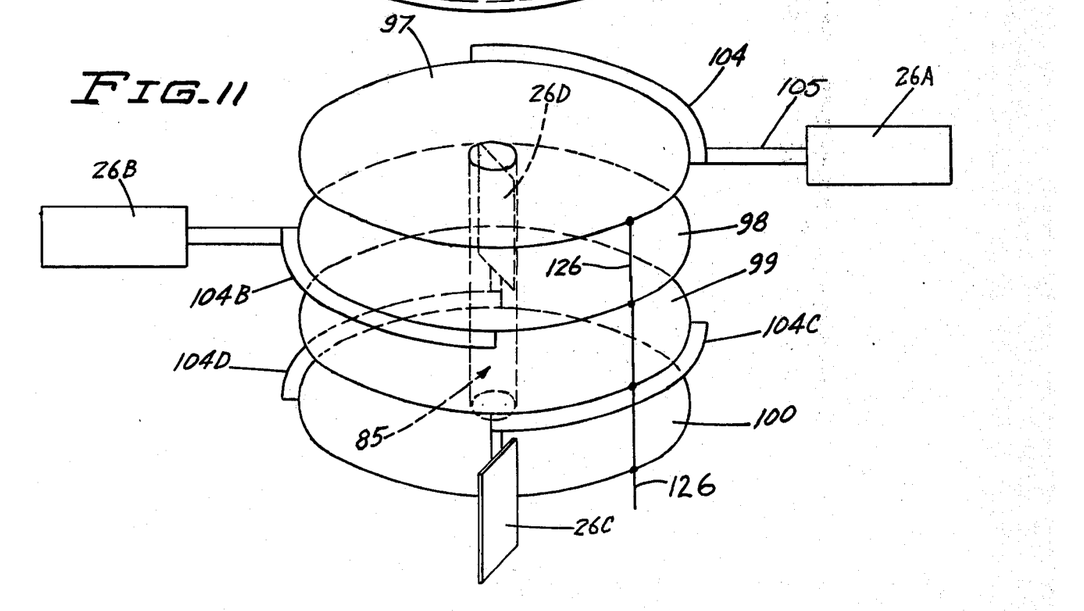
FIG. 11 is also a diagrammatic view schematically illustrating the control of the pitch of four rotor blades.

As the speed of first drive collar 117 and second drive collar 118 approaches zero, solenoid 308 will be deactivated to cause key 144 to be resiliently urged against the interior of first drive collar 117 and the key 146 to be resiliently urged against the interior of second drive collar 118. When these two drive collars reach position as illustrated in FIGS. 7 and 8, key 144 will enter opening 150 and key 145 will enter opening 151, thus locking rotor blades 26*b* and 26*c* in trail position behind rotor supporting hub assembly 21.

Solenoids 152 and 153 will then be activated to withdraw keys 146 and 147 from openings 155*a* and 156*a* and as they turn they will be deenergized so that these keys are resiliently urged against the drive cap 89 and the third drive collar 118, respectively. When rotor blades 26*a* and 26*d* arrive at trail position, keys 146 and 147 will move into openings 155 and 156 respectively, thus completing the locking of all of the rotor blades 26 in the trail position as indicated in FIGS. 1, 2, 12, and 15 through 17.

Should there be a tendency for the trailing rotor blades 26 to vibrate, pitch change mechanism can be utilized to tip the blades until each rests against an adjacent blade as seen in FIG. 9, thus dampening out or eliminating any tendency for or toward vibration which might be self-destructive.

TRANSITION FROM HORIZONTAL TO VERTICAL FLIGHT

In preparing to land, the speeding, horizontally moving aircraft noses upward to about a 45° altitude or until stalling begins. At that point, in the aircraft of FIGS. 1 and 15, for example, the wings 24,24 with their jet engines 23,23 will continue to rotate toward the vertical while the fuselage 20*a* dips toward horizontal.

Simultaneously the rotor blades are put into operation as follows. Solenoids 152 and 153 are activated to disconnect the drive cap 89 and its rotor blade 26*a* and to disconnect the third annular rotor blade drive collar 119 and its rotor blade 26*d* from the other drive collars. Sufficient power will be supplied to drive shaft 85 and the third annular collar 119 so that the drive cap and this third collar will begin to rotate.

As soon as such rotation begins, solenoids 152 and 153 will be deenergized, and when rotor blades 26*a* and 26*d* reach positions diametrically opposite the rotor blades 26*b* and 26*c*, keys 146 and 147 will enter openings 155*a* and 156*a* respectively.

Solenoid 308 will be energized to disconnect collars 26*b* and 26*c* from the support column 84. Sufficient power will be transmitted from the prime mover 29 to rotate each set of blades in an opposite direction and at a sufficient rate to maintain altitude; and the power from the jet engines 23 will be reduced or eliminated as desired.

To utilize the hub assembly to drive all four rotor blades in one direction, changes are made in the positioning of the pitch of the rotor blades such that all have the same pitch in the same forward direction. The power train to third collar 119 can either be reversed in direction or can be disconnected.

Then to change from horizontal to vertical flight, after the blades 26*a* and 26*b* are locked to each other in end-to-end relation, and the blades 26*c* and 26*d* are similarly locked, solenoid 304 will be deenergized to allow key 41 to resiliently ride on the exterior of first annular rotor blade drive collar 119. When key 41 reaches opening 303 in the first collar 117, it will enter it, locking the blades 26*a* and 26*b* at right angles to blades 26*c* and 26*d*.

In the form of the invention as illustrated in FIG. 16, the fuselage 20*a* of an aircraft has mounted thereto a transverse propeller drive and support bracket 401 to which is mounted a propeller 402 designed to rotate on an axis which is substantially horizontal and is transverse to the longitudinal axis of the aircraft. Means (not shown) are provided for driving the propeller 402 when the aircraft is in the vertical flight configuration. See U.S. Pat. No. 2,959,373 to Zuck.

When the aircraft is in horizontal flight, in order to reduce the drag, in addition to positioning the rotor blades 26 as shown in full lines, it is also desirable to prevent the propeller 402 from windmilling and to hold it in alignment with the longitudinal axis of the aircraft. For this purpose, indentations are provided in the outer edges of each of the blades of the propeller, and one of those indentations is aligned with the longitudinal axis of the aircraft and in close proximity to the craft through the application of power through the power means in any usual or preferred manner. A hydraulic stop finger 403 is mounted in the vertical stabilizer. The finger 403 is actuated by an appropriate control 405 through hydraulic line 404 to contact one of the indentations in propeller 402 to positively fix the position of the propeller until such time as it is desirable to utilize it again. At that point, the action of the finger 403 will be reversed and the propeller will be free to rotate.

In the embodiment of the invention shown in FIGS. 12 through 14, power to the rotor blades, particularly useful on takeoff, can be supplemented by means of rockets 172 provided on the ends of each blade. These rockets can also be utilized to provide for a burst of power on landing.

The rockets can be controlled from within the aircraft by any usual or preferred means. See U.S. Pat. No. 3,010,678 to Gose; U.S. Pat. No. 2,674,421 to DeCenzo; and U.S. Pat. No. 2,437,700 to MacFarland.

It is to be appreciated that an aircraft made according to the embodiments of the invention can be designed to land on water, as well as land. This can be done by providing a waterproof fuselage and/or by previding flotation supporting structures such as pontoons. Also, the aircraft can be provided with skiis S, as seen in FIG. 12, for example.

Also illustrated in FIG. 12 is a means for rotating the rotor blades from power furnished from without the fuselage of the aircraft. A vertical rotor assembly drive shaft 174 extends downwardly below the bottom of the fuselage 20a of the aircraft. This drive shaft 174 inside the aircraft can be operably connected to the clutch 31 or the gear box 32 thus to assist or replace the engine and become part of the prime mover 29. A cross arm 175 on the drive shaft 174 supports rockets 176 which are mounted at each end of the cross arm. These rockets can likewise be controlled by any usual or preferred means. See the above identified patent to Gose. Should it be desirable to use this additional rocket power as supplementary to obtain a burst of vertical lifting power on takeoff and landing, an additional overrunning clutch (not shown) can connect to the gear train 32 or through the clutch 31 as seen in FIG. 7, thus to allow the short burst of power from the rockets 176 to augment the power from the conventional engine or other prime mover 29.

The embodiments of the invention in which an exclusive property or privilege is claimed are defined as follows:

1. An aircraft having body structure capable of generally horizontal flight and capable of vertical flight while said body structure is in a generally horizontal position;
   first means for propelling said body structure in generally horizontal flight; and
   second means for propelling said body structure in generally vertical flight;
   wherein said second means includes a rotor system;
   said rotor system including;
      slip plate means,
      rotor blade means,
      means for moving said slip plate means, and
      means operatively interconnecting said slip plate means and said rotor blade means whereby the pitch of said blade means is changed in response to movement of said slip means in a predetermined manner;
   wherein said slip plate means has a central opening bounded by a surface having a concave curvature;
   internally threaded first slip plate support sleeve means for supporting said slip plate means, said sleeve means including a convex surface in engagement with said concave surface of said slip plate means;
   said slip plate means and said slip plate support sleeve means being movable relative to each other about said contacting concave and convex surfaces;
   an externally threaded supporting member mounted in said internally threaded first slip plate support sleeve means;
   wherein said means for moving said slip plate means includes means for turning said externally threaded supporting member; and
   the movement of said externally threaded supporting member causing said slip plate support means to move longitudinally with respect to the externally threaded supporting member.

2. The aircraft of claim 1, wherein said means for turning said externally threaded supporting member includes:
   a first gear element integral with said externally threaded supporting member;
   a second gear element in meshing relation to said first gear element;
   a control element;
   a shaft operatively connected to said control element and said second gear element;
   said shaft being rotatable about its longitudinal axis to rotate said second gear element in response to manipulation of said control element.

3. An aircraft having body structure capable of generally horizontal flight and capable of vertical flight while said body structure is in a generally horizontal position;
   first means for propelling said body structure in generally horizontal flight; and
   second means for propelling said body structure in generally vertical flight;
   wherein said second means includes a rotor system;
   said rotor system including:
      slip plate means,
      rotor blade means including a plurality of radially extending rotor blades,
      means for moving said slip plate means, and
      means operatively interconnecting said slip plate means and said rotor blade means whereby the pitch of said blade means is changed in response to movement of said slip means in a predetermined manner;
   said second means also including:
      A. a vertical drive shaft rotatably mounted with respect to said aircraft body structure and extending upwardly therefrom;
      B. a drive means to rotate said drive shaft;
      C. a portion of said drive shaft being provided with external threads;
      D. an internally threaded clutch plate sleeve mounted on and enclosing said threaded portion of said drive shaft;
      E. a drive cap rotatably mounted on an upper outer end of said drive shaft;
      F. means including said internally threaded clutch plate sleeve for rotatably driving said drive cap responsive to rotation of said drive shaft;
      G. said drive cap being drivingly associated with at least a first pair of said radially extending rotor blades which are driven by rotation of said cap for movement of each blade about the axis of rotation of said drive shaft to cause generally vertical movement of said aircraft;

H. spring means interposed between said drive cap and said internally threaded clutch plate sleeve continuously biasing said sleeve away from said cap longitudinally of the axis of rotation of said drive shaft and said cap;

I. the rotation of said drive shaft when driven by said drive means being effective to force the threaded clutch plate sleeve upwardly toward and into driving relationship to said drive cap;

J. a first slip plate support sleeve means rotatably mounted on and with respect to said internally threaded clutch plate sleeve but fixed against longitudinal movement with respect thereto, said slip plate support sleeve means having at least two spaced apart, vertically disposed convex surfaces spaced along the length of the drive shaft;

K. wherein said slip plate means includes a first set of two slip plates, each having a central opening therethrough and providing a surface of concave curvature to engage with one of the convex surfaces provided by said slip plate support sleeve means;

L. each of said slip plates being movable relative to said slip plate support sleeve means over said contacting convex and concave surfaces; and M. wherein said means for operatively interconnecting said slip plate means and said rotor means includes means for operatively interconnecting each of said slip plate means with one of said rotor blades.

4. The aircraft of claim 3 and an overrunning clutch between the drive shaft and the drive means positioned so that drive means can drive the drive shaft in a first direction and the drive shaft is free to rotate in said first direction whether or not it is being driven by said drive means.

5. The aircraft of claim 4 wherein movement of said slip plates from position wherein said drive shaft and said clutch plate sleeve are in driving relation to said drive cap and to position wherein said spring means has urged said clutch plate sleeve to the limit of its movement away from said cap results in a change of rotor blade pitch from a positive lifting pitch to a negative pitch causing some direction windmilling due to vertically downward movement of the aircraft through the air.

6. The aircraft of claim 5 and means to lock said drive cap and a first annular drive collar with respect to said aircraft body structure to fix each of said rotor blades in trail position behind said drive shaft when the aircraft is being propelled in said generally horizontal flight.

7. The aircraft of claim 6;
transverse propeller drive and support structure extending rearwardly from said aircraft body structure;
a propeller drivably associated with respect to said support structure on a horizontal axis transverse to the longitudinal axis of said aircraft body structure, said propeller being provided with at least one detent opening therein;
a stop finger situated adjacent the outer path of travel of the propeller; and
means to cause said finger to releasably engage said detent when said propeller is in a generally horizontal position and in parallel alignment with the aircraft longitudinal axis when the aircraft is in said generally horizontal flight.

8. The aircraft of claim 5; and
a second slip plate support sleeve means concentrically mounted below said first slip plate support sleeve means for longitudinal and rotative movement with respect to said drive shaft;
means connecting said first slip plate support sleeve means and said second slip plate support sleeve means to each other to insure simultaneous concurrent longitudinal movement of each with respect to said drive shaft;
said second slip plate support sleeve means having at least two spaced apart convex surfaces vertically spaced along the length of said drive shaft;
wherein said slip plate means also includes a second set of two slip plates each mounted on one of said convex surfaces and each having a central opening therethrough and providing a surface of convex curvature to engage with one of said convex second slip plate support sleeve means surfaces;
each of said second set of slip plates being movable relative to one of said second slip plate support sleeve means about said engaged convex and concave surfaces;
a fixed support column extending upwardly from said aircraft body structure in surrounding relation to said drive shaft;
a first annular drive collar mounted to rotate with respect to said support column in adjacent concentric relation to said drive cap;
means for selectively keying and unkeying said first drive collar to and from said drive cap;
wherein said drive cap directly supports a first of said first pair of rotor blades and wherein a second of said first pair of blades is supported in said first annular drive collar;
second and third annular rotor blade drive collars rotatably supported with respect to said support column in concentric relation to said drive shaft and in adjacent relation to each other and to said first annular drive collar;
means for selectively keying and unkeying said second and third drive collars to and from each other;
a second pair of rotor blades;
said second annular rotor blade drive collar supporting a third of said rotor blades in radially outwardly extending position from said drive shaft;
said third annular rotor blade drive collar supporting a fourth of said rotor blades in radially outwardly extending relationship to said drive shaft;
means to rotate said second and third drive collars; and
wherein said means for operatively interconnecting said slip plate means and said rotor blade means includes means operatively interconnecting each of said second set of slip plates to its associated rotor blade.

9. The aircraft of claim 8; and means to lock said drive cap and each of said drive collars with respect to said support column to position all of the rotor blades in a trail position behind said drive shaft when the aircraft is being propelled in said generally horizontal flight.

10. The aircraft of claim 9; and pitch control means for rotating each rotor blade on its longitudinal axis when so fixed in trail position until each blade edge is in contacting, vibration dampening relation to each adjacent blade.

11. The aircraft of claim 8 wherein the means to rotate said second and third drive collars includes:
   a. means for selectively keying and unkeying said first drive collar and said second collar to and from each other;
   b. said means for keying said cap to said first drive collar; and
   c. said means for keying said second and third drive collars to each other.

12. The aircraft of claim 8 wherein the means to rotate said second and third drive collars includes:
   a. said means for keying said second and third drive collars to each other; and
   b. means for driving one of said second and third drive collars to rotate in direction opposite that which said drive shaft drives said drive cap.

13. The aircraft of claim 8; and
   further means operatively interconnecting each of said slip plates;
   control means operative on said further means for effective simultaneous movement of each of said slip plates with respect to its slip plate support sleeve means, whereby such movement results in simultaneous pitch changes in each rotor blade.

14. The aircraft of claim 8 wherein the first slip plate support sleeve means includes:
   a. an externally threaded supporting member rotatably mounted with respect to said internally threaded clutch plate sleeve but fixed against longitudinal movement with respect thereto, and
   b. said first internally threaded slip plate support sleeve means threadably mounted on said externally threaded supporting member;
   wherein the means for moving said slip plate means includes means for turning said externally threaded supporting member; and
   the movement of said externally threaded supporting member causing said first slip plate support sleeve means to move longitudinally with respect to the externally threaded supporting member.

15. The aircraft of claim 14, wherein said means for turning said externally threaded supporting member includes:
   a first gear element integral with said externally threaded member;
   a second gear element in meshing relation to said first gear element;
   a control element;
   a shaft operatively connected to said control element and said second gear element;
   said connecting shaft being rotatable about its longitudinal axis to rotate said second gear element in response to manipulation of said control element.

16. The aircraft of claim 15, and
   further means operatively interconnecting each of said slip plates;
   control means operative on said further means for effective simultaneous movement of each of said slip plates with respect to its slip plate support sleeve means, whereby such movement results in simultaneous pitch changes in each rotor blade.

17. An aircraft having body structure capable of generally horizontal flight and capable of vertical flight while said body structure is in a generally horizontal position;
   first means for propelling said body structure in generally horizontal flight; and
   second means for propelling said body structure in generally vertical flight;
   wherein said second means includes a rotor system;
   said rotor system including:
     slip plate means,
     rotor blade means,
     means for moving said slip plate means, and
     means operatively interconnecting said slip plate means and said rotor blade means whereby the pitch of said blade means is changed in response to movement of said slip means in a predetermined manner;
   wherein said slip plate means has a central opening bounded by a concave part-spherical surface;
   an internally threaded first slip plate support sleeve means for supporting said slip plate means, said plate support sleeve means including a convex part-spherical surface in engagement with said concave surface of said slip plate means;
   said slip plate means and said internally threaded first slip plate support sleeve means being movable relative to each other about said engaged concave and convex surfaces;
   a substantially spherical joint member provided in said slip plate means;
   connecting means connected to said spherical joint member; and
   control means operatively connected with said connecting means for moving said spherical joint member and thereby causing movement of said slip ring means whereby said movement of said slip ring means effect a change in the pitch of the rotor blade means.

18. An aircraft having body structure capable of generally horizontal flight and capable of vertical flight while said body structure is in a generally horizontal position;
   first means for propelling said body structure in generally horizontal flight; and
   second means for propelling said body structure in generally vertical flight;
   wherein said second means includes a rotor system;
   said rotor system including:
     slip plate means,
     rotor blade means including a plurality of radially extending rotor blades,
     means for moving said slip plate means, and
     means operatively interconnecting said slip plate means and said rotor blade means whereby the pitch of said blade means is changed in response to movement of said slip plate means in a predetermined manner;
   said second means including:
     A. a vertical drive shaft rotatably mounted with respect to said aircraft body structure and extending upwardly therefrom;
     B. drive means to rotate said drive shaft;
     C. a portion of said drive shaft being provided with external threads;
     D. an internally threaded clutch plate sleeve mounted on and enclosing said threaded portion of said drive shaft;
     E. a drive cap rotatably mounted to an upper outer end of said drive shaft;
     F. means including said internally threaded clutch plate sleeve for rotatably driving said drive cap responsive to rotation of said drive shaft;
     G. said drive cap being drivingly associated with at least a pair of said radially extending rotor blades which are driven by rotation of said cap for movement of each blade about the axis of rotation of said drive shaft to cause generally vertical movement of said aircraft;

H. spring means interposed between said drive cap and said internally threaded clutch plate sleeve continuously biasing said sleeve away from said cap longitudinally of the axis of rotation of said drive shaft and said cap;

I. the rotation of said drive shaft when driven by said drive means being effective to force the threaded clutch plate sleeve upwardly toward and into driving relationship to said drive cap;

J. a slip plate support sleeve means rotatably mounted on and with respect to said internally threaded clutch plate sleeve but fixed against longitudinal movement with respect thereto, said slip plate support sleeve means having at least two spaced apart, vertically disposed convex part-spherical surfaces spaced along the length of the drive shaft;

K. wherein said slip plate means includes a first set of two slip plates, each slip plate having a central opening therethrough and providing a socket having a surface of concave part-spherical curvature to engage with one of the convex surfaces provided by said slip plate support sleeve means;

L. each of said slip plates being movable relative to said slip plate support sleeve means over said contacting convex and concave surfaces;

M. wherein said slip plates are substantially circular and consist of two opposed circular parts which are substantially mirror images of one another;

N. fastener means extending between said parts and removably holding them together with at least portions thereof in abutting relationship;

O. each of said parts including a part-hemispherical socket which when said parts are in face-to-face abutting relationship defines said concave part-spherical socket; and P. control means operatively connected with said slip plate support sleeve means for moving said slip plate sockets thereby causing movement of said slip plates whereby to effect the change in the pitch of said rotor blades.

19. The aircraft of claim 18; and a substantially spherical joint member provided in each of said slip plates;

connecting means connected to all said spherical joint members; and said control means operatively connected with said spherical joint connecting means for simultaneously moving said spherical joint members and thereby causing movement of said slip plates relative to said slip plate support sleeve means to thereby effect said change in pitch of said rotor blades.

* * * * *

UNITED STATES PATENT AND TRADEMARK OFFICE
CERTIFICATE OF CORRECTION

PATENT NO. : 3,995,793
DATED : December 7, 1976
INVENTOR(S) : Russell T. Wing

It is certified that error appears in the above-identified patent and that said Letters Patent are hereby corrected as shown below:

Column 7, line 45, "mentioned" should be --mounted--.

Column 12, line 6, "pot" should be --port--.

Column 13, line 45, "key 146" should be --key 145--.

Column 15, line 18, "previding" should be --providing--.

Column 16, line 12, after "support" insert -- sleeve --.

Column 16, Claim 3, subparagraph E, line 1, "on" should be --to--.

Column 18, line 18, "convex" should be --concave--.

Signed and Sealed this

Fifteenth Day of March 1977

[SEAL]

Attest:

RUTH C. MASON
*Attesting Officer*

C. MARSHALL DANN
*Commissioner of Patents and Trademarks*